United States Patent
Liu et al.

(10) Patent No.: US 10,438,544 B1
(45) Date of Patent: Oct. 8, 2019

(54) ELECTRONIC DEVICE AND POWER ADJUSTMENT METHOD THEREOF

(71) Applicant: Wistron Corporation, New Taipei (TW)

(72) Inventors: Yuanliang Liu, New Taipei (TW); Wenlong Yang, New Taipei (TW); Yongqiang Li, New Taipei (TW); Lixing Zhu, New Taipei (TW); Junxin Qiu, New Taipei (TW); Yongbo Li, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/218,481

(22) Filed: Dec. 13, 2018

(30) Foreign Application Priority Data

Oct. 10, 2018 (CN) .......................... 2018 1 1178117

(51) Int. Cl.
| | |
|---|---|
| G09G 3/36 | (2006.01) |
| G09G 3/34 | (2006.01) |
| H02J 7/00 | (2006.01) |
| G09G 3/22 | (2006.01) |
| G06F 1/3218 | (2019.01) |

(52) U.S. Cl.
CPC ............ *G09G 3/3406* (2013.01); *H02J 7/007* (2013.01); *G06F 1/3218* (2013.01); *G09G 3/22* (2013.01); *G09G 2310/0297* (2013.01); *G09G 2320/0626* (2013.01); *G09G 2330/021* (2013.01); *G09G 2330/04* (2013.01); *H02J 2007/0095* (2013.01)

(58) Field of Classification Search
CPC . G06F 1/3218; H02J 7/007; H02J 2007/0095; G09G 3/22; G09G 2310/0297
USPC .......................................... 315/291; 345/102
See application file for complete search history.

(56) References Cited

U.S. PATENT DOCUMENTS

| | | | |
|---|---|---|---|
| 9,420,657 B2 | 8/2016 | Hua et al. | |
| 2014/0111030 A1* | 4/2014 | Chou | G05F 1/10 |
| | | | 307/130 |
| 2014/0125251 A1 | 5/2014 | Hua et al. | |
| 2015/0364943 A1* | 12/2015 | Vick | H02J 7/025 |
| | | | 320/108 |
| 2017/0187200 A1* | 6/2017 | Somerville | H02J 7/0052 |
| 2018/0097376 A1* | 4/2018 | Renaud-Byme | H02J 7/0036 |
| 2018/0375361 A1* | 12/2018 | Sultenfuss | H02J 7/0068 |

FOREIGN PATENT DOCUMENTS

CN           103813420           5/2014

* cited by examiner

Primary Examiner — Thuy V Tran
(74) Attorney, Agent, or Firm — JCIPRNET

(57) ABSTRACT

An electronic device and a power adjustment method thereof are provided. The electronic device includes at least one data connection port, a charge controller, at least one charging connection port, and a power controller. The charge controller controls charging power of the at least one charging connection port. The power controller is directly or indirectly electrically coupled to the at least one data connection port and the charge controller. The power controller assigns a first idle power corresponding to the at least one data connection port not connected to an external data load to the charging controller for use in response to determining that the at least one charging connection port is connected to an external to-be-charged load and one of the at least one data connection port is not connected to the external data load.

20 Claims, 2 Drawing Sheets

ELECTRONIC DEVICE AND POWER ADJUSTMENT METHOD THEREOF

CROSS-REFERENCE TO RELATED APPLICATION

This application claims the priority benefit of China application serial no. 201811178117.3, filed on Oct. 10, 2018. The entirety of the above-mentioned patent application is hereby incorporated by reference herein and made a part of this specification.

BACKGROUND

Field of the Disclosure

The disclosure relates to a power management technique, and more particularly to an electronic device having a display function and a power adjustment method using the same.

Description of Related Art

As technology advances, electronic devices with display functions (e.g., household televisions, displays, etc.) have been provided with many additional features in addition to increasingly sophisticated display functions. For example, the additional functions may be high dynamic range imaging (HDR) function, which enhances the contrast and vividness of the image, data transmission function in the universal serial bus (USB) 2.0/ISB 3.0/USB type-C, fast charging function (typical fast charging function may be divided into two charging specifications, namely BC1.2 and Power Delivery (PD)), wireless networking function, set-top box function, etc.

These additional functions are typically implemented by arranging hardware modules corresponding to the additional functions on the main board of the electronic device. Therefore, when designing a power supply board/power supply module that supplies the entire power supply to the electronic device and a corresponding adapter, the power supply board/power supply module needs to be able to provide power consumption required for operation when all of the above functions are performed. As a result, the costs for manufacturing power supply boards/power supply modules and adapters are gradually increased.

In view of the above, one of the aims of research is to find out whether or not the electronic device having these additional functions can be designed with lower overall operating power and the power supply board/power supply module and the adapter can be realized with a lower power of power supply.

SUMMARY

The disclosure provides an electronic device and a power adjustment method thereof, which fully distribute power in a limited power supply, so that the charging connection port can perform fast charging on the external to-be-charged load with better power, and the original display function and data transmission function of electronic device can be maintained.

The electronic device of the disclosure includes at least one data connection port, a charge controller, at least one charging connection port, and a power controller. The charge controller controls the charging power of the at least one charging connection port. The power controller is directly or indirectly electrically coupled to the at least one data connection port and the charge controller. The power controller assigns a first idle power corresponding to the at least one data connection port that is not connected to the external data load to the charge controller for use when it is determined that the at least one charging connection port is connected to the external to-be-charged load and one of the at least one data connection port is not connected to the external data load.

The electronic device of the disclosure includes a backlight source, a backlight controller, a charge controller, at least one charging connection port, and a power controller. The backlight controller controls the current brightness power of the backlight source. The charge controller controls the charging power of the at least one charging connection port. The power controller is directly or indirectly electrically coupled to the charge controller. The power controller assigns a second idle power between the maximum brightness power and the current brightness power to the charge controller for use when it is determined that the current brightness power does not reach the maximum brightness power.

The disclosure discloses a power adjustment method of an electronic device. The electronic device includes at least one data connection port, a charge controller, and at least one charging connection port. The power adjustment method includes the following steps: determining whether the at least one charging connection port is connected to an external to-be-charged load and determining whether the at least one data connection port is connected to an external data load; and in response to determining that the at least one charging connection port is connected to the external to-be-charged load and determining that one of the at least one data connection port is not connected to the external data load, assigning the first idle power corresponding to the at least one data connection port not connected to the external data load to the charge controller for use.

The disclosure discloses a power adjustment method of an electronic device. The electronic device includes a backlight source, a backlight controller that controls the current brightness power of the backlight source, a charge controller, and at least one charging connection port. The power adjustment method includes: determining whether the current brightness power reaches a maximum brightness power; and in response to determining that the current brightness power does not reach the maximum brightness power, assigning the second idle power between the maximum brightness power and the current brightness power to the charge controller for use.

Based on the above, in order to efficiently and fully distribute the power in the electronic device in limited power supply, the electronic device in the embodiment of the disclosure detects whether there is a data connection port connected to the external data load, and assigns the idle power corresponding to the data connection port not connected to the external data load to the charge controller for use to perform fast charging, thereby achieving dynamic power management while maintaining the original display function (but the brightness of the display screen might be reduced) and data transmission function of the electronic device. On the other hand, since the charge controller and the corresponding charging connection port inherently have a protection mechanism and it is difficult to directly adjust the charging power thereof, under the condition where the charging connection port is connected to the external to-be-charged load and charging is being performed, if the number of data connection port connected to the external data load increases, the electronic device in the embodiment of the disclosure reduces the brightness power of the backlight source to compensate for the power consumption of the data connection port, thereby maintaining the charging power of the charge controller and avoiding damage of the charge controller, such that protection for the charge controller and charging socket can be realized. Accordingly, the upper limit of the power supply board/power supply module and the adapter may be reduced, thereby reducing the overall manufacturing cost of the electronic device.

In order to make the aforementioned features and advantages of the disclosure more comprehensible, embodiments accompanying figures are described in detail below.

DESCRIPTION OF EMBODIMENTS

Since not all of the additional functions of an electronic device are always performed, the electronic device does not need such a high amount of power. In particular, current emphasis is mainly laid on the charging efficiency of electronic products, users wish that the electronic products on the corresponding socket with charging function can be fully charged as soon as possible, but current electronic devices can only be applied to the socket with charging function based on the rated power set at the factory. Therefore, in order to effectively and fully distribute the power in the electronic device in a limited power supply, and to enable the charging socket to have a higher charging power, it is desirable that the electronic product connected to the charging socket can be fully charged as soon as possible. The electronic device in the embodiment of the disclosure transfers the idle power of the backlight source and the idle power of the data connection port not connected to the external data load to the charge controller by using dynamic power management, so that the charging socket can provide more power to the external to-be-charged load. In addition, the electronic device in the embodiment of the disclosure reduces the brightness power of the backlight source wherever necessary to compensate for the power consumption of the data connection port when the charging socket is performing the charging operation, thereby achieving protection for the charge controller and the charging socket.

Figure 1:
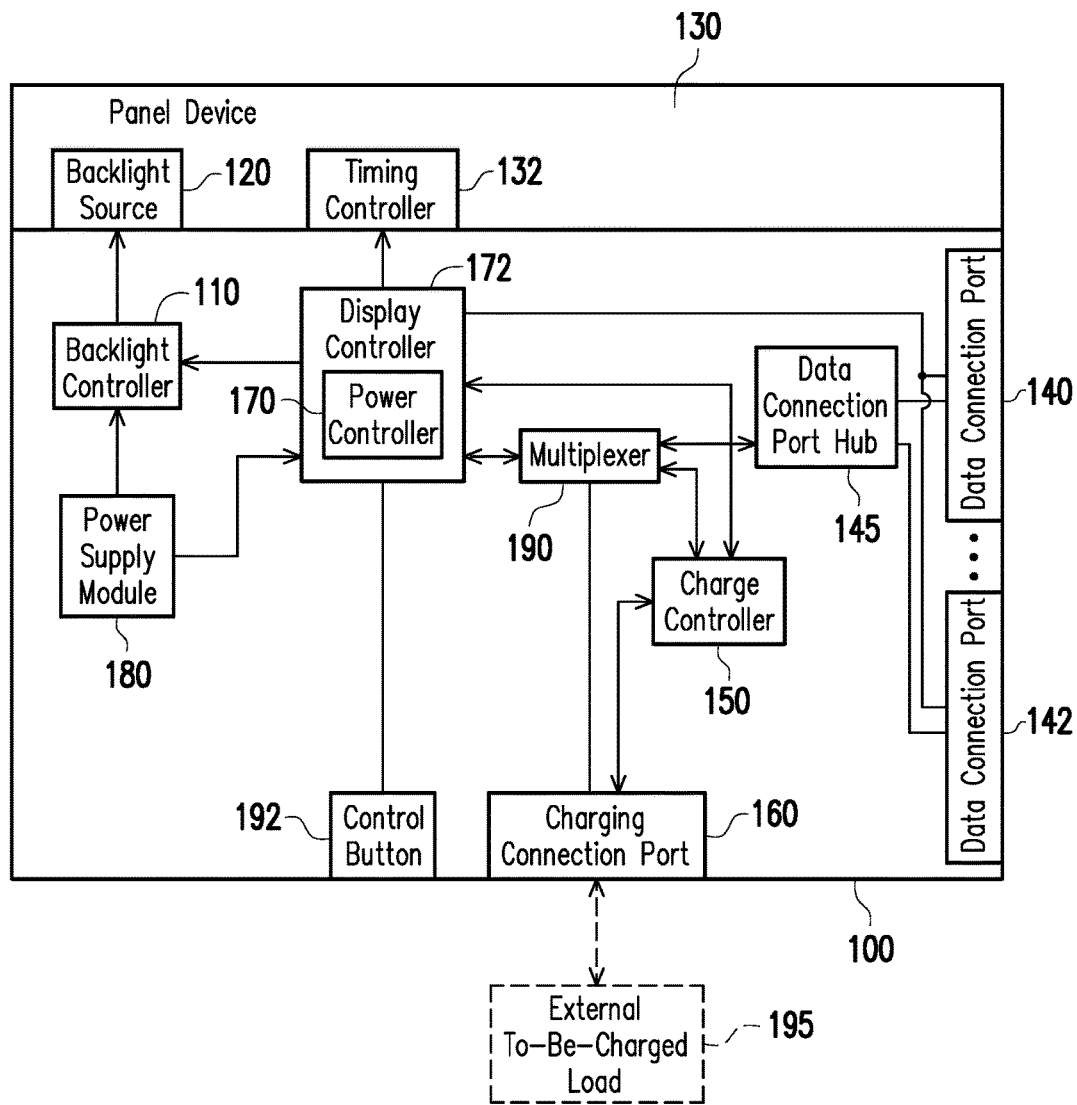
FIG. 1 is a block diagram of an electronic device according to an embodiment of the disclosure.

FIG. 1 is a block diagram of an electronic device 100 according to an embodiment of the disclosure. The electronic device 100 may be one of a smart TV and a display. On the other hand, the electronic device 100 may be a consumer electronic product having a display function. The electronic device 100 includes a backlight controller 110, a panel device 130, a backlight source 120 located in the panel device 130, at least one data connection port (e.g., data connection ports 140 and 142), a charge controller 150, and at least one charging connection port (for example, charging connection port 160) and a power controller 170. The electronic device 100 further includes a power supply module 180, a display controller 172 (including, for example, a scaler), a data connection port hub 145, a multiplexer 190, and a control button 192.

The electronic device 100 of the exemplary embodiment mainly implements a display function by using the panel device 130, implements a data transmission function by using the data connection port hub 145 and the data connection port 140/142, implements a fast charging function by using the charge controller 150 and the charging connection port 160, and uses the power controller 170 in the display controller 172 to implement dynamic power management and protection for the charge controller and the charging socket.

The backlight source 120 may be disposed in a backlight module (BLM) of the panel device 130. The backlight module may be composed of assemblies such as a reflective sheet, a backlight source 120 (for example, a cold cathode fluorescent lamp or a light emitting diode (LED)), a light-guide plate, a diffusion sheet, and a prim sheet. The backlight controller 110 is used to control the current brightness power of the backlight source 120. On the other hand, the power controller 170 located in the display controller 172 in the embodiment may also adjust the current brightness power of the backlight source 120 by using the backlight controller 110, thereby adjusting the overall backlight brightness of the panel device 130.

The panel device 130 includes a timing controller 132 and a backlight source 120. The display controller 172 provides an image signal to the timing controller 132 according to an image source (e.g., set-top box, optical fiber signal decoder, etc.) to display the image signal on the panel device 130. The display controller 172 may use Low-Voltage Differential Signaling (LVDS) to transmit the image signal to the timing controller 132.

Data connection ports 140 and 142 may be connection ports that conform to the Universal Serial Bus (USB) 2.0 or USB 3.0 specifications. In one implementation, each of the data connection ports 140 and 142 is provided with a detecting component (e.g., a mechanical elastic sheet, a circuit contact, or a software event signal) coupled to the power controller 170 in the display controller 172. Taking the detecting component in the form of a mechanical elastic sheet as an example. When an external data load (for example, an external electronic device such as a flash drive, a USB cable, etc.) is connected to the data connection ports 140, 142, the mechanical elastic sheet of the data connection ports 140, 142 is triggered to inform the power controller 170 in the display controller 172 of the signal connected to the data connection port. As a result, the power controller 170 knows which data connection ports are connected with the external data load for use, and which data connection ports are not connected to the external data load. That is to say, the power controller 170 may detect the connection condition of each data connection port through the above-mentioned detecting component. The data connection port hub 145 is coupled to the data connection port (e.g., 140 and 142) in the electronic device 100 to process communication between the external data load and the electronic device 100. In another implementation, the power controller 170 may know the connection condition of each of the data connection ports 140 and 142 through the data connection port hub 145. For example, the detecting component is coupled to the data connection port hub 145 so that the data connection port hub 145 can detect the connection condition of each of the data connection ports and inform the power controller 170 of the connection conditions. Alternatively, the power controller 170 actively communicates with the data connection port hub 145 to acquire the connection status of each of the data connection ports.

Both the charge controller 150 and the charging connection port 160 comply with the same fast charging protocol, such as the BC1.2 specification or the Power Delivery (PD)

specification. Those who utilize the embodiment may adjust the number of the charging connection port 160 according to actual requirements. This embodiment is exemplified with a single charging connection port 160. For ease of description, the device in this embodiment connected to the charging connection port 160 is referred to as an external to-be-charged load 195. The external to-be-charged load 195 is, for example, but not limited to, a consumer electronic device that conforms to the above-described fast charging protocol, such as a smart phone, a notebook computer, a tablet computer, and the like.

The display controller 172 includes the power controller 170. The power controller 170 may be a microprocessor. The power supply module 180 receives external city power or power in the battery as a power source and provides the power required for each component. The power controller 170 of the exemplary embodiment detects the power usage of each of the components in the electronic device 100 and assigns the idle power to other components that are in use and may require a larger power (e.g., the charge controller 150 and the charging connection port 160).

A first receiving end of the multiplexer 190 is coupled to the signal transmission end of the charge controller 150. A second input end of the multiplexer 190 is coupled to the signal transmission end of the data connection port hub. An output end of the multiplexer 190 is coupled to the display controller 172. The display controller 172 utilizes the multiplexer 190 to selectively communicate with the data connection port hub 145 and the charge controller 150. In some embodiments, the multiplexer 190 may also selectively allow the charge controller 150 to communicate with the display controller 172 depending on whether the charging connection port 160 is connected to the signal of the external to-be-charged load 195. The data connection port hub 145, the charge controller 150, and the display controller 172 in the exemplary embodiment communicate with each other by using an inter-integrated circuit (I2C).

The control button 192 is coupled to the display controller 172. The user may send a brightness adjustment signal to the display controller 172 through the control button 192. The display controller 172 adjusts the brightness of the backlight source 120 according to the brightness adjustment signal through the backlight controller 110. That is, the brightness of the display device 130 in the electronic device 100 may be controlled and adjusted by the display controller 172.

Herein, it is explained how to implement "dynamic power management" by using the electronic device 100 in the embodiment of the disclosure. It is assumed that the total power of the electronic device 100 is Ptotal, the current brightness power of the backlight source 120 controlled by the backlight controller 110 is NIL the charging power of the charging connection port 160 controlled by the charge controller 150 is Ppd, and the power consumption of the data connection ports 140 and 142 is Pusb. Moreover, each of the components in the electronic device 100 consumes some power, such as the power supply module 180, the display controller 172, the multiplexer 190, the data connection port hub 145, and the like. Therefore, the value of the total power Ptotal is greater than or equal to the sum of the current brightness power Pb1, the charging power Ppd, and the power consumption Pusb.

When the external to-be-charged load 195 is connected to the charging connection port 160, the charge controller 150 may communicate and coordinate with the corresponding charge controller in the external to-be-charged load 195 through the charging connection port 160, thereby determining the charging power that can be processed by both sides together. The charge controller 150 of the exemplary embodiment and the charge controller in the external to-be-charged load 195 communicate with each other by using the CC-Link protocol. For example, the external to-be-charged load 195 that conforms to the power delivery (PD) specification may utilize one of 45 W, 50 W, 55 W, and 60 W as the charging power. Generally speaking, typically the charge controller 150 disposed in the electronic device 100 only uses the rated charging power that is preset when the electronic device 100 is manufactured as the charging power described above. That is to say, typically the charge controller 150 can only supply power to the external to-be-charged load 195 with the rated charging power, and cannot adjust the value of the charging power according to the power usage of the electronic device 100. For example, if the rated charging power is only 50 W, the charge controller 150 can only perform charging operation with the external to-be-charged load 195 by using 50 W as the charging power, and dynamic power management cannot be performed.

In view of the above, the power controller 170 in the embodiment of the disclosure is capable of looking for the idle power in the electronic device 100 for the charge controller 150 to use. In detail, the power controller 170 detects the connection condition of at least one data connection port (e.g., the data connection port 140, 142) in the electronic device 100 to determine whether the data connection ports are connected, and let the power controller 170 know how many data connection ports are not connected to the external data load. Moreover, when it is determined that the charging connection port 160 is connected to the external to-be-charged load 195 and it is determined that one of the data connection ports 140, 142 is not connected to the external data load, the power controller 170 assigns the first idle power corresponding to the data connection port that is not connected to the external data load to the charge controller 150 for use, thereby increasing the charging capability of the charging connection port 160 by using the corresponding charging specification.

The above embodiment is exemplified herein with reference to Table 1. It is assumed that the backlight source 120 of the electronic device 100 has a brightness power (i.e., maximum brightness power) of 20 W when the backlight brightness is 100%; and the power consumption of each of the data connection ports (exemplified as USB port in the exemplary embodiment) is 4.5 W. The electronic device 100 of the embodiment has two data connection ports 140 and 142; the charging connection port 160 (for example, USB type-C) has a rated charging power of 45 W when being manufactured, and a protection point power corresponding to the rated charging power is 54 W. Each of the data in Table 1 is defined by the above data.

TABLE 1

| Condition | Backlight source brightness | Current brightness power | Number of inserted USB port | Consumption power of USB port | Charging power of component 160 | Protection point power of component 160 |
|---|---|---|---|---|---|---|
| 1 | 100% | 20 W | 2 | 9 W | 45 W | 54 W |
| 2 | 100% | 20 W | 1 | 4.5 W | 49.5 W | 59.4 W |
| 3 | 100% | 20 W | 0 | 0 W | 54 W | 64.8 W |

Condition 1 in Table 1 indicates that two data connection ports (USB ports) in the electronic device 100 are both connected to the external data load, and therefore the USB power consumption is a value (9 W) obtained by multiplying 4.5 W by 2. Condition 2 in Table 1 indicates that one of the data connection ports (USB port) in the electronic device 100 is connected to the external data load, but the other data connection port (USB port) is not connected, and therefore the power controller 170 of FIG. 1 supplies the idle power 4.5 W to the charge controller 150 for use to increase the charging power of the charging connection port 160 connected to the external to-be-charged load from 45 W in the condition 1 to 49.5 W in the condition 2, and the protection point power of the charging connection port 160 is increased from 54 W in the condition 1 to 59.4 W in condition 2. Condition 3 in Table 1 indicates that neither of the two data connection ports (USB ports) in the electronic device 100 is connected to the external data load, and therefore the power controller 170 of FIG. 1 supplies the idle power 9 W to the charge controller 150 for use, so that the charging power of the charging connection port 160 connected to the external to-be-charged load is increased to 54 W in condition 3, and the protection point power of the charging connection port 160 is increased to 64.8 W in condition 2.

In addition, the power controller 170 also determines whether the current brightness power of the backlight source 120 controlled by the backlight controller 110 reaches the maximum brightness power. If the current brightness power of the backlight source 120 does not reach the maximum brightness, the power controller 170 assigns the second idle power between the maximum brightness power and the current brightness power to the charge controller 150 to utilize, thereby using the corresponding charging specification to improve the charging capability of the charging connection port 160. The above embodiment is exemplified herein with reference to Table 2, and is designed by using relevant setting parameters in Table 1.

TABLE 2

| Condition | Backlight source brightness | Current brightness power | Number of inserted USB port | Consumption power of USB port | Charging power of component 160 | Protection point power of component 160 |
|---|---|---|---|---|---|---|
| 1 | 100% | 20 W | 2 | 9 W | 45 W | 54 W |
| 2 | 100% | 20 W | 1 | 4.5 W | 49.5 W | 59.4 W |
| 3 | 100% | 20 W | 0 | 0 W | 54 W | 64.8 W |
| 4 | 90% | 18 W | 2 | 9 W | 47 W | 56.4 W |
| 5 | 80% | 16 W | 2 | 9 W | 49 W | 58.8 W |
| . . . | . . . | . . . | 2 | 9 W | . . . | . . . |
| 6 | 30% | 6 W | 2 | 9 W | 59 W | 70.8 W |
| 7 | 70% | 14 W | 0 | 0 W | 60 W | 72 W |

Conditions 1 to 3 in Table 2 are the same as conditions 1 to 3 in Table 1. Conditions 4 to 6 in Table 2 describe the circumstances where two data connection ports (USB ports) are both connected to the external data load. Condition 4 in Table 2 indicates that the brightness of the backlight source 120 is adjusted from 100% to 90%, and the current brightness power of the backlight source 120 at this time is 18 W. Therefore, the power controller 170 assigns the second idle power (2 W) between the maximum brightness power (20 W) and the current brightness power (18 W) to the charge controller 150 for use, such that the charging power of the charging connection port 160 connected to the external to-be-charged load is increased from 45 W in condition 1 to 47 W in condition 4, and the protection point power of charging connection port 160 is increased from 54 W in condition 1 to 56.4 W in condition 4. Condition 5 in Table 1 indicates that the brightness of the backlight source 120 is adjusted to 80%, and the current brightness power of the backlight source 120 at this time is 16 W. Therefore, the power controller 170 in FIG. 1 supplies the idle power 4 W to the charge controller 150 for use, such that the charging power of the charging connection port 160 connected to the external to-be-charged load is increased to 49 W in condition 5, and the protection point power of the charging connection port 160 is increased to 58.8 W in condition 5. Likewise, the condition 6 in Table 2 indicates that the brightness of the backlight source 120 is adjusted to 30%, the idle power is 14 W, the charging power of the charging connection port 160 is increased to 59 W in condition 6, and the protection point power of the charging connection port 160 is increased to 70.8 W in condition 6.

Condition 7 in Table 2 describes the condition where neither of the two data connection ports (USB port) is connected to the external data load. Condition 7 in Table 2 indicates that the brightness of the backlight source 120 is adjusted to 70%, the idle power of the backlight source 120 is 6 W, and the idle power of the USB port is 9 W. Therefore, the power controller 170 boosts the charging power of the charging connection port 160 to 60 W in condition 7, and boosts the protection point power of the charging connection port 160 to 72 W in condition 7.

Here, it is explained how to implement "protection for the charge controller and the charging socket" by using the electronic device 100 in the embodiment of the disclosure. When the external to-be-charged load 195 and the electronic device 100 having fast charging function are connected through the charging connection port 160, since the external to-be-charged load 195 is likely to generate an instantaneous current spike, a protection mechanism is required for the charge controller 150 and the charging connection port 160. Therefore, the protection point power corresponding to the "protection mechanism" in the embodiment of the disclosure is determined according to a setting relationship of the maximum output power of the charging connection port 160. In other words, the power controller 170 utilizes the maximum charging power supplied to the charge controller 150 to configure the protection mechanism for the surge current.

Further, the power controller 170 determines whether the charging connection port 160 is connected to the external to-be-charged load 195 through the charge controller 150. Moreover, under the circumstances where the charging connection port 160 is connected to the external to-be-charged load 195, the power controller 170 communicates with the external to-be-charged load 195 to determine whether the charging power currently used by the charge controller 150 may exceed the rated charging power. When the charging power currently used by the charge controller 150 may exceed the rated charging power, the power controller 170 assigns the first idle power corresponding to the data connection ports 140, 142 not connected to the external data load to the charge controller 150 for use. Alternatively, the power controller 170 assigns the second idle power between the maximum brightness power of the backlight source 120 and the current brightness power to the charge controller 150 for use. Alternatively, the power controller 170 assigns both of the first idle power and the second idle power to the charge controller 150 for use.

Moreover, under the circumstances where the charging connection port 160 is connected to the external to-be-charged load 195, and the charge controller 150 has determined the charging power with the external to-be-charged load 195 and charging is being performed, the power controller 170 determines whether the number of the data connection ports 140, 142 connected to the external data load is increased. When the number of the data connection ports 140, 142 connected to the external data load increases, it indicates that power needs to be obtained from elsewhere to maintain the power consumption of the newly added external data load. However, since the charge controller 150 is performing the charging operation, if the power supplied to the charge controller 150 is reduced suddenly, the charge controller 150, the charging connection port 160, and even the external to-be-charged load 195 are likely to be damaged. On this occasion, the power controller 170 reduces the current brightness power through the backlight controller 110 to compensate for the power consumption of the data connection ports 140, 142 connected to the external data load, thereby maintaining the charging power of the charge controller 150. The above embodiment is exemplified herein with reference to Table 3, and is designed using relevant setting parameters in Table 1.

TABLE 3

| Condition | Backlight source brightness | Current brightness power | Number of inserted USB port | Consumption power of USB port | Charging power of component 160 | Protection point power of component 160 |
|---|---|---|---|---|---|---|
| 7 | 70% | 14 W | 0 | 0 W | 60 W | 72 W |
| 8 | 48% | 9.5 W | 1 | 4.5 W | 60 W | 72 W |

Condition 7 in Table 3 indicates that, after performing dynamic power management, the brightness of the backlight source 120 is 70% (brightness power is 14 W); the number of connections of the data connection port is 0; and the charging connection port 160 is using the charging power of 60 W to perform the charging operation with the external to-be-charged load 195. If the condition 7 in Table 3 is changed to the condition 8 at this time, that is, when one of the data connection ports is changed from being disconnected into being connected to the external data load, in order to maintain the charging power (60 W) of the charging connection port 160, the power controller 170 reduces the brightness of the backlight source 120 to 48%, the brightness power thereof is also reduced to 9.5 W, and transfers these powers to the charging connection port that is connected to the external data load, thereby maintaining the function of the data connection port. On this occasion, condition 8 causes the backlight brightness of the panel device 130 to be greatly reduced.

Figure 2:
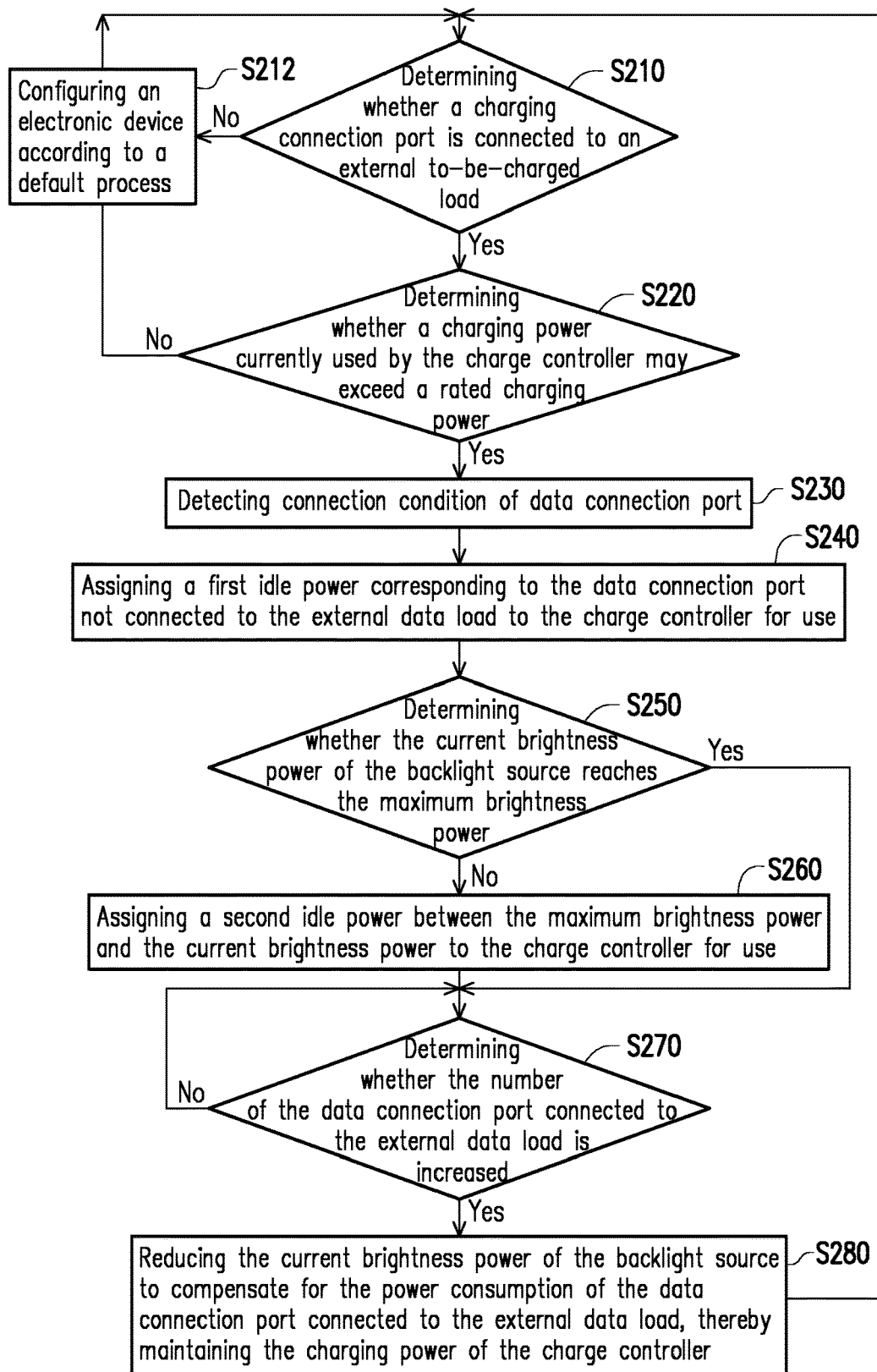
FIG. 2 is a flow chart of a power adjustment method of an electronic device according to an embodiment of the disclosure.

FIG. 2 is a flow chart of a power adjustment method of an electronic device according to an embodiment of the disclosure. The power adjustment method of FIG. 2 may be implemented in the electronic device 100 as shown in FIG. 1. The electronic device 100 conforming to the power adjustment method includes a backlight source 120, a backlight controller 110, at least one data connection port (such as the data connection ports 140, 142 of FIG. 1), a charge controller 150, at least one charging connection port 160, and a power controller 170 executing this method. In step S210, the power controller 170 determines whether the charging connection port 160 is connected to the external to-be-charged load 195. If the determining result is "No" in step S210, the power controller 170 proceeds to step S212 to set the power consumption of the backlight source 120 and the data connection ports 140, 142 of the electronic device 100, and the power of the charging connection port 160 according to a default process.

If the determining result is "Yes" in step S210, that is, under the circumstances where the charging connection port 160 is connected to the external to-be-charged load 195, the power controller 170 proceeds to step S220 to determine whether the charging power currently used by the charge controller 150 may exceed the rated charging power. The charge controller 150 communicates with the external to-be-charged load 195 to determine whether to allow the charging power to exceed the rated charging power. If the determining result is "No" in step S220, the power controller 170 returns to step S212 to configure the respective components of the electronic device 100 according to the default process. If the determining result is "Yes" in step S220, the power controller 170 proceeds to step S230 to detect the connection condition of the data connection ports 140, 142. In step S240, the power controller 170 assigns the first idle power corresponding to the data connection port not connected to the external data load to the charge controller 150 for use.

In step S250, the power controller 170 determines whether the current brightness power of the backlight source 120 reaches the maximum brightness power through the backlight controller 110. If the determining result is "Yes" in step S250, the power controller 170 skips step S260 to proceed to step S270. If the determining result is "No" in step S250, the power controller 170 assigns the second idle power between the maximum brightness power and the current brightness power to the charge controller 150 for use through the backlight controller 110.

It should be indicated that steps S230 to S240 are determinations and adjustments for the first idle power of the data connection ports 140, 142, and steps S250 to S260 are determinations and adjustments for the second idle power of the backlight source 120. Therefore, those who apply the embodiment may switch the sequence of the "steps S230 to S240" and the "steps S250 to S260", and the embodiment of the disclosure can still be realized. In the embodiment of the disclosure, the determination and adjustment of the first idle power (i.e., steps S230 to S240) is followed by the determination and adjustment of the second idle power (i.e., steps S250 to S260). Those who apply the embodiment may also perform the determination and adjustment of the second idle power (steps S250 to S260) first, and then perform the determination and adjustment of the first idle power (steps S230 to S240). That is, the sequence of the above steps may be switched. In addition, in other embodiments of the disclosure, those who apply the embodiment may selectively choose to perform only one of the "determination and adjustment of the first idle power (steps S230 to S240)" and the "determination and adjustment of the second idle power (steps S250 to S260)".

In step S270, under the circumstances where the charging connection port 160 is connected to the external to-be-charged load 195, and the charge controller 150 has determined the charging power with the external to-be-charged load 195 and charging is being performed, the power controller 170 determines whether the number of the data connection ports 140, 142 connected to the external data load is increased. When the number of the at least one data connection port 140, 142 connected to the external data load is not increased, the power controller 170 continues to proceed with step S270. In contrast, when the number of the at least one data connection port 140, 142 connected to the external data load is increased, the process proceeds from step S270 to step S280, and the power controller 170 reduces the current brightness power of the backlight source 120 to compensate for the power consumption of the data connection ports 140, 142 connected to the external data load, thereby maintaining the charging power of the charge controller 150.

In summary, in order to efficiently and fully distribute the power in the electronic device in limited power supply, the electronic device in the embodiment of the disclosure detects whether there is a data connection port connected to the external data load, and assigns the idle power corresponding to the data connection port not connected to the external data load to the charge controller for use to perform fast charging, thereby achieving dynamic power management while maintaining the original display function (but the brightness of the display screen might be reduced) and data transmission function of the electronic device. On the other hand, since the charge controller and the corresponding charging connection port inherently have a protection mechanism and it is difficult to directly adjust the charging power thereof, under the condition where the charging connection port is connected to the external to-be-charged load and charging is being performed, if the number of data connection port connected to the external data load increases, the electronic device in the embodiment of the disclosure reduces the brightness power of the backlight source to compensate for the power consumption of the data connection port, thereby maintaining the charging power of the charge controller and avoiding damage of the charge controller, such that protection for the charge controller and charging socket can be realized. Accordingly, the upper limit of the power supply board/power supply module and the adapter may be reduced, thereby reducing the overall manufacturing cost of the electronic device.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. An electronic device, comprising:
    at least one data connection port;
    a charge controller and at least one charging connection port, the charge controller controlling a charging power of the at least one charging connection port; and
    a power controller, directly or indirectly electrically coupled to the at least one data connection port and the charge controller,
    wherein the power controller determines that the at least one charging connection port is connected to an external to-be-charged load and determines that one of the at least one data connection port is not connected to an external data load, and assigns a first idle power corresponding to the at least one data connection port not connected to the external data load to the charge controller for use.

2. The electronic device according to claim 1, wherein the electronic device further comprises a backlight source and a backlight controller controlling a current brightness power of the backlight source, when the power controller determines that the current brightness power does not reach a maximum brightness power, a second idle power between the maximum brightness power and the current brightness power is assigned to the charge controller for use.

3. The electronic device according to claim 2, wherein the power controller determines, by the charge controller, that the at least one charging connection port is connected to the external to-be-charged load, and determines that when the charging power currently used by the charge controller may exceed a rated charging power, the power controller assigns the second idle power to the charge controller for use.

4. The electronic device according to claim 2, wherein, under the circumstances where the at least one charging connection port is connected to the external to-be-charged load and charging is being performed, the power controller determines:
    when the number of the at least one data connection port connected to the external data load is increased, the power controller reduces the current brightness power through the backlight controller to compensate for a power consumption of the at least one data connection port connected to the external data load, thereby maintaining the charging power of the charge controller.

5. The electronic device according to claim 2, further comprising:
    a display controller, comprising the power controller; and
    a panel device, comprising a timing controller and the backlight source,
    wherein the display controller provides an image signal to the timing controller to display the image signal on the panel device.

6. The electronic device according to claim 5, further comprising:
    a control button, coupled to the display controller, wherein a user sends a brightness adjustment signal to the display controller through the control button, and the display controller adjusts a brightness of the backlight source according to the brightness adjustment signal through the backlight controller.

7. The electronic device according to claim 1, wherein the power controller determines, by the charge controller, that the at least one charging connection port is connected to the external to-be-charged load, and determines:
    when the charging power currently used by the charge controller may exceed a rated charging power, the power controller assigns the first idle power to the charge controller for use.

8. The electronic device according to claim 1, further comprising:
    a data connection port hub, coupled to the at least one data connection port to process communication between the external data load and the electronic device.

9. The electronic device according to claim 8, further comprising:
    a multiplexer, having a first receiving end coupled to the charge controller, a second input end of the multiplexer coupled to the data connection port hub, and an output end of the multiplexer coupled to a display controller,
    wherein the display controller utilizes the multiplexer to selectively communicate with the data connection port hub and the charge controller.

10. An electronic device, comprising:
    a backlight source;
    a backlight controller, controlling a current brightness power of the backlight source;
    a charge controller and at least one charging connection port, the charge controller controlling a charging power of the at least one charging connection port; and
    a power controller, directly or indirectly electrically coupled to the charge controller,
    wherein when the power controller determines that the current brightness power does not reach a maximum brightness power, an idle power between the maximum brightness power and the current brightness power is assigned to the charge controller for use.

11. The electronic device according to claim 10, wherein the power controller determines, by the charge controller, that the at least one charging connection port is connected to an external to-be-charged load, and determines that when the charging power currently used by the charge controller may exceed a rated charging power, the power controller assigns the idle power to the charge controller for use.

12. The electronic device according to claim 10, wherein the electronic device further comprises at least one data connection port, wherein the power controller is directly or indirectly electrically coupled to the at least one data connection port, and, under the circumstances where the at least one charging connection port is connected to an external to-be-charged load and charging is being performed, the power controller determines that when the number of the at least one data connection port connected to the external data load is increased, the power controller reduces the current brightness power through the backlight controller to compensate for a power consumption of the at least one data connection port connected to the external data load, thereby maintaining the charging power of the charge controller.

13. A power adjustment method of an electronic device, wherein the electronic device comprises at least one data connection port, a charge controller, and at least one charging connection port, the power adjustment method comprising:

determining whether the at least one charging connection port is connected to an external to-be-charged load and determining whether the at least one data connection port is connected to an external data load; and when it is determined that the at least one charging connection port is connected to the external to-be-charged load and determined that one of the at least one data connection port is not connected to the external data load, a first idle power corresponding to the at least one data connection port not connected to the external data load is assigned to the charge controller for use.

14. The power adjustment method according to claim 13, wherein the electronic device further comprises a backlight source and a backlight controller controlling a current brightness power of the backlight source, and the power adjustment method further comprising:

determining whether the current brightness power reaches a maximum brightness power; and when it is determined that the current brightness power does not reach the maximum brightness power, a second idle power between the maximum brightness power and the current brightness power is assigned to the charge controller for use.

15. The power adjustment method according to claim 14, further comprising:

when a charging power currently used by the charge controller may exceed a rated charging power, the second idle power is assigned to the charge controller for use.

16. The power adjustment method according to claim 14, under the circumstances where the at least one charging connection port is connected to the external to-be-charged load and charging is being performed, the power adjustment method further comprising:

when the number of the at least one data connection port connected to the external data load is increased, the power controller reduces the current brightness power through the backlight controller to compensate for a power consumption of the at least one data connection port connected to the external data load, thereby maintaining the charging power of the charge controller.

17. The power adjustment method according to claim 13, further comprising:

when a charging power currently used by the charge controller may exceed a rated charging power, the first idle power is assigned to the charge controller for use.

18. A power adjustment method of an electronic device, wherein the electronic device comprises a backlight source, a backlight controller controlling a current brightness power of the backlight source, a charge controller, and at least one charging connection port, the power adjustment method comprising:

determining whether the current brightness power reaches a maximum brightness power; and when it is determined that the current brightness power does not reach the maximum brightness power, an idle power between the maximum brightness power and the current brightness power is assigned to the charge controller for use.

19. The power adjustment method according to claim 18, further comprising:

when a charging power currently used by the charge controller may exceed a rated charging power, the idle power is assigned to the charge controller for use.

20. The power adjustment method according to claim 18, wherein the electronic device further comprises at least one data connection port, wherein, under the circumstances that the at least one charging connection port is connected to an external to-be-charged load and charging is being performed, the power adjustment method further comprises:

when the number of the at least one data connection port connected to an external data load is increased, reducing the current brightness power through the backlight controller to compensate for a power consumption of the at least one data connection port connected to the external data load, thereby maintaining the charging power of the charge controller.

* * * * *